United States Patent
Lai et al.

(10) Patent No.: US 9,412,165 B1
(45) Date of Patent: Aug. 9, 2016

(54) NB-CAM MODULE CALIBRATION METHOD AND SYSTEM USING THE SAME

(71) Applicant: BISON ELECTRONICS INC., Taipei (TW)

(72) Inventors: Mung-Shiue Lai, Taoyuan County (TW); Jung-Hui Hung, Taichung (TW); Yun-Ju Li, New Taipei (TW)

(73) Assignee: BISON ELECTRONICS INC., Taipei (TW)

( * ) Notice: Subject to any disclaimer, the term of this patent is extended or adjusted under 35 U.S.C. 154(b) by 29 days.

(21) Appl. No.: 14/820,934

(22) Filed: Aug. 7, 2015

(30) Foreign Application Priority Data

Feb. 9, 2015 (TW) .............. 104104236 A

(51) Int. Cl.
| | |
|---|---|
| H04N 17/00 | (2006.01) |
| G06T 7/00 | (2006.01) |
| H04N 5/225 | (2006.01) |
| H04N 9/73 | (2006.01) |
| H04N 5/202 | (2006.01) |
| H04N 5/357 | (2011.01) |
| H04N 5/361 | (2011.01) |

(52) U.S. Cl.
CPC .............. *G06T 7/0018* (2013.01); *H04N 5/202* (2013.01); *H04N 5/2254* (2013.01); *H04N 5/3575* (2013.01); *H04N 5/361* (2013.01); *H04N 9/73* (2013.01); *H04N 17/002* (2013.01)

(58) Field of Classification Search
CPC ..... H04N 17/002; H04N 17/00; H04N 17/02; H04N 13/0239; H04N 13/0242; H04N 9/73; G06T 7/0085; G06T 7/0018; G06T 7/002; G06T 7/0022
USPC .............. 348/187, 180, 47, 48, 655; 382/154; 340/501; 702/85, 99, 104
IPC .................................. H04N 17/00, 17/02, 9/73
See application file for complete search history.

(56) References Cited

U.S. PATENT DOCUMENTS

2013/0147777 A1* 6/2013 Lau ........................ G02B 26/00
345/207

* cited by examiner

*Primary Examiner* — Sherrie Hsia
(74) *Attorney, Agent, or Firm* — Li & Cai Intellectual Property (USA) Office

(57) ABSTRACT

A NB-cam module calibration method is provided. The method includes the following steps: an image which the optical lens of each NB-cam module spotlights onto a light sensor of each NB-cam module is calibrated to generate a compensation parameter set corresponding to each NB-cam module; a color temperature table within the compiled lens-driver firmware is modified according to each compensation parameter set; and the compiled and modified lens-driver firmware is directly burned to each NB-cam module.

14 Claims, 6 Drawing Sheets

NB-CAM MODULE CALIBRATION METHOD AND SYSTEM USING THE SAME

BACKGROUND OF THE INVENTION

1. Field of the Invention

The instant disclosure relates to a NB-cam module calibration method; in particular, to a NB-cam module calibration method for calibrating quickly and a system using the same.

2. Description of Related Art

Generally speaking, when the production amount is huge, there must be some minor differences between each product, and the production of the NB-cam module is not an exception. On the other hand, there is a problem that certain optical lenses are unable to condense the light uniformly, and thus there would be lens shading existing in the image obtained by the under-calibrated NB-cam module due to the optical attenuation and the refraction.

In addition, producing a huge amount of the NB-cam modules consumes a lot of time. The prior art would first pick certain NB-cam modules as bases, make an image record for each of these NB-cam modules under different calibrated color temperatures, analyze and find the most similar NB-cam modules with statistics, and then use these few NB-cam modules as samples for image calibration. After that, the calibration parameters of these samples are compiled into the burning images as the burning images used for producing the NB-cam modules.

The above mentioned prior art might decrease the time consumption for generating the parameters, but analyzing to find the most similar NB-cam modules with statistics may result in defects, because lenses of each NB-cam module would not be all the same and thus the calibration results cannot be perfectly suitable for every NB-cam module. Though the same burning images are burned into the NB-cam modules having the same elements, and this results in certain differences, which makes different output images.

SUMMARY OF THE INVENTION

In order to solve the above problems, the instant disclosure provides a NB-cam module calibration method, and the NB-cam module calibration method comprises the steps: calibrating an image, wherein the image is generated when an optical lens of each NB-cam module condenses a light upon a light sensor of each NB-cam module, to generate a compensation parameter set corresponding to each NB-cam module; directly modifying a color temperature table in a compiled lens-driver firmware according to the compensation parameter set; and directly burning each modified and compiled lens-driver firmware to each NB-cam module.

The instant disclosure further provides a NB-cam module calibration system, and the NB-cam module calibration system comprises a plurality of NB-cam modules and a burning module, and the burning module comprises a calibration unit and a compilation unit. Each NB-cam module condenses the light via an optical lens upon a light sensor of each NB-cam module to generate an image. The calibration unit calibrates the image generated when the optical lens of each NB-cam module condenses the light upon the light sensor of the NB-cam module, in order to generate a compensation parameter set corresponding to the NB-cam module. The compilation unit is connected to the calibration unit for compiling a lens-driver firmware and directly modifying a color temperature table in the complied lens-driver firmware according to each compensation parameter set. The burning module directly burns each modified and complied lens-driver firmware to each NB-cam module.

To sum up, the NB-cam module calibration method and the system using the same helps different kinds of NB-cam module have the process of calibration and burn fast. To be specific, for each different NB-cam module, the NB-cam module calibration method and the system using the same of the instant disclosure can obtain the corresponding compensation parameter set, and directly modify the burning image of the compiled lens-driver firmware according to this compensation parameter set, which dramatically decreases the time consumption for the prior art to calibrate the parameter of the NB-cam module and then to compile the lens-driver firmware again. Thus, the NB-cam module calibration method and the system using the same of the instant disclosure can reduce the time consumption for calibration in the prior art, and can increase the practicability for the calibration of each NB-cam module during the production process.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
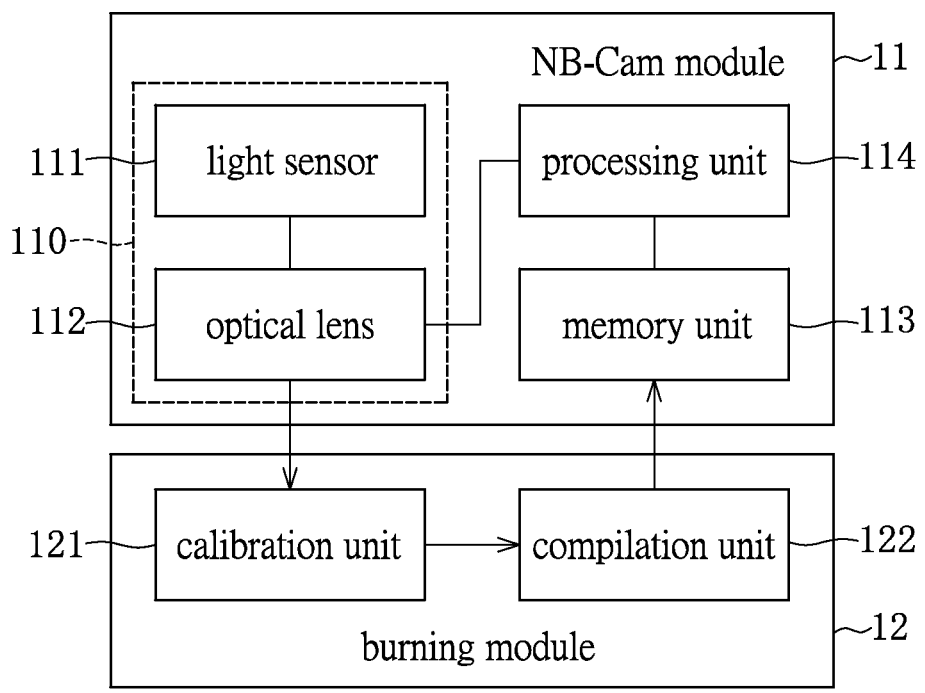
FIG. 1 shows a schematic drawing of a NB-cam module calibration system of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the instant disclosure. As used herein, the term "and/or" includes any and all combinations of one or more of the associated listed items.

FIG. 1 shows a schematic drawing of a NB-cam module calibration system of one embodiment of the instant disclosure. The calibration system 1 comprises a NB-cam module 11 and a burning module 12. The NB-cam module 11 comprises a light sensor 111, an optical lens 112, a memory unit 113 and a processing unit 114. The burning module 12 comprises a calibration unit 121 and a compilation unit 122. Moreover, the light sensor 111 and the optical lens 112 form an under-calibrated block 110. The burning module 12 is connected to the NB-cam module 11. The processing unit 114 is connected to the optical lens 112, the memory unit 113 is connected to the processing unit 114, and the compilation unit is connected to the calibration unit 121.

Generally speaking, the NB-cam module 11 condenses the light via the optical lens 112 upon the light sensor 111 to generate images, and further calibrates or compensates the images via the processing unit 114. In the embodiment of the instant disclosure, the NB-cam module of the notebook camera would be taken as an example for the following illustration. In addition, considering the low-cost requirement for notebook products, the operation scale of the present NB-cam module would not be comparable to the operation scale of the image processing chips used in NB-cam modules of other digital cameras, single lens cameras or smart phones.

In this embodiment, the light sensor 111 is a Complementary Metal-Oxide-Semiconductor sensor (CMOS sensor). Specifically speaking, in the NB-cam module 11, the CMOS sensor is a semiconductor element that can record the light changes, of which the unit is usually megapixels. In practice, the megapixel value of the NB-cam module 11 means the resolution of the light sensor 111. The CMOS sensor is made of semiconductor material that mainly contains silicon (Si) and germanium (Ge), such that there are both negatively charged and positively charged semiconductors contained. In other embodiments, the light sensor 111 can also be a Charge Coupled Device (CCD). It is worth mentioning that, using a CMOS sensor as the light sensor 111 can lower the cost of the NB-cam module 11, decrease the power consumption and make the production process easier.

The optical lens 112 usually comprises a plurality of lenses. Specifically speaking, the optical lens 112 forms images via different lenses. The characteristics of the lens includes the dispersion coefficient, the index of refraction, radius of curvature . . . etc, and the optical lens 112 can be produced via combining different lenses depending on need. However, the material of the optical lens 112 can be decided by the production cost or effects, and the characteristics thereof are not focused on herein in the instant disclosure.

The memory unit 113 comprises suitable circuits, logics and/or coding. In this embodiment, the memory unit 113 is the flash memory, for storing the needed lens-driver firmware of the NB-cam module 11 or other information of the NB-cam module 11. However, those skilled in the art would understand that, the memory unit 113 can be other non-volatile memory (NVRAM), the read-only memory (ROM) or the like, and the types of the memory unit 113 should not be limited herein in the instant disclosure. The lens-driver firmware is used to drive the NB-cam module 11 that has the compiled native codes, which has a file extension, such as ".bin", wherein the native codes comprise the compiled codes for calibrating or compensating the color temperature of images. The codes of the color temperature table (including a plurality of calibration parameters) can be fixed coded addresses among the codes of the lens-driver firmware, such as the coding segment from the coded address 0x0100 to 0x0300.

The processing unit 114 comprises suitable circuits, logics and/or coding. In this embodiment, the processing unit 114 is the "8005I" for driving the NB-cam module 11 according to the lens-driver firmware. To be specific, the processing unit 114 drives the optical lens 112 to calibrate or compensate the color shift or lens shading of images generated by the light sensor 111. In other words, the processing unit 114 correspondingly calibrates or compensates the lens shading or color shift of images generated by the light sensor 111 and the optical lens 112 according to the color temperature table in the lens-driver firmware. In other embodiments, the processing unit 114 can be an image processing chip having better operational function, the micro control unit (MCU) or other circuit elements having operational function. Although the NB-cam module used in the notebook is taken for example herein, the NB-cam module 11 can also be other high level NB-cam modules used in the single lens cameras or smart phones. To be more specific, the types of the processing unit 114 are not restricted herein in the instant disclosure.

The burning module 12 is used to calibrate the NB-cam module 11, and to modify the color temperature table of the lens-driver firmware according to the compensation parameter set obtained after the calibration, so as to further burn the modified lens-driver firmware into the memory unit 113 of the NB-cam module 11, wherein the parameters are, for example, the shading, white balance, optical axis center, etc. In other words, the burning module 12 would update the original sample calibration parameters according to the compensation parameter set of each NB-cam module 11.

In the burning module 12, the calibration unit 121 comprises suitable circuits, logics and/or coding for calibrating the image generated when the optical lens 112 of the NB-cam module 11 condenses the light upon the light sensor 111, so as to generate the compensation parameter set. More precisely, the calibration unit 121 captures the shading image generated when the optical lens 112 condenses the light at the calibrated color temperature upon the light sensor 111, such that the calibration unit 121 generates the first adjust parameter set in the compensation parameter set of the NB-cam module 11 in order to calibrate the primary color curves of the NB-cam module 11 at each calibrated color temperature and make them align at an optical axis center. Moreover, the calibration unit 121 generates the second adjust parameter set according to the color shift variation when the primary color curves at each calibrated color temperature are calibrated to align at an optical axis center, so as to compensate the variation of the primary color curve of the image.

In other words, in this embodiment, the calibration unit 121 generates the compensation parameter set which comprises a first adjust parameter set and a second adjust parameter set. The calibration unit 121 adjusts the primary color curves of the NB-cam module via using two sets pf compensation parameters, to make the curves smooth and overlapped. After that, the calibration unit 121 compensates the primary curves at different calibrated color temperatures, to have the best calibration effect.

The compilation unit 122 comprises suitable circuits, logics and/or coding, to compile the lens-driver firmware used by the NB-cam module 11, and to modify the color temperature table in the compiled lens-driver firmware according to the compensation parameter set generated by the calibration unit 121. More precisely, after the compilation unit 122 calibrates the first NB-cam module 11 and there is no lens-driver firmware compiled yet, the compilation unit 122 would do the first-time compiling of the lens-driver firmware. After that, when the other substantial NB-cam modules 11 are calibrated, the compilation unit 122 can directly modify the complied lens-driver firmware (such as the file with a file extension like ".bin" mentioned above). The compilation unit 122 has already learned that the code of the color temperature table is at the fixed coded address among the codes of the lens-driver firmware, so after the compilation unit 122 correspondingly modifies the codes of the color temperature table in the lens-driver firmware, the modified lens-driver firmware can be directly provided to the burning module 12 for having a burning process, which saves the time consumption for again compiling the lens-driver firmware.

Figure 2:
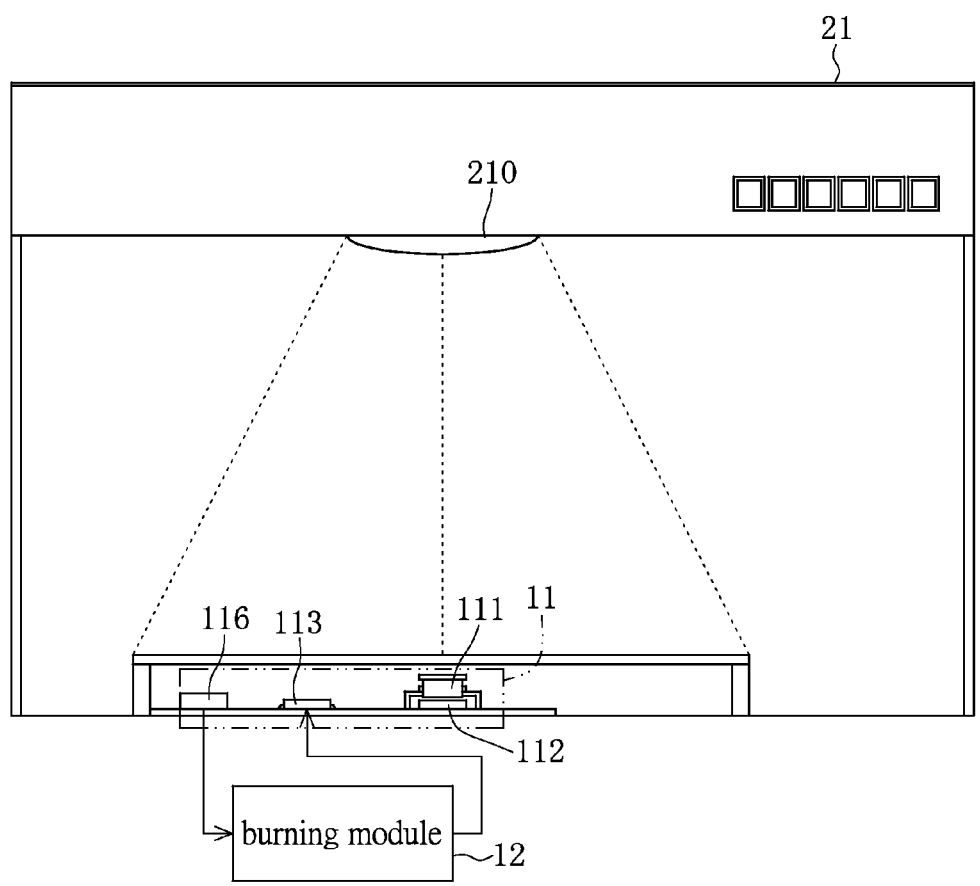
FIG. 2 shows a schematic drawing of a NB-cam module calibration system used in a standard illuminate light box of one embodiment of the instant disclosure.

After that, the following description is to further illustrate the implementing environment for having the calibration in the embodiment of the instant disclosure. FIG. 2 shows a schematic drawing of a NB-cam module calibration system used in a standard illuminate light box of one embodiment of the instant disclosure. In conjunction with FIG. 1 and FIG. 2, the calibration system 1 further comprises a standard illuminate light box 21. In this embodiment, the standard illuminate light box 21 provides the light of at least one calibrated color temperature via the light source 210. The producer captures the shading images at three to six calibrated color temperatures for the calibration process, wherein the three calibrated color temperatures are 2800K(A-light), 4150K(CWF) and 6500K(D65), or the six calibrated color temperatures are 2800K(A-light), 3500K(U35), 4150K(CWF), 5000K(D50), 6500K(D65) and 7500K(D75). In practice, the number of the calibrated temperature colors is decided based on the needs of the producer, and it is not limited herein.

In FIG. 2, the optical lens 111 and the light sensor 112 of the NB-cam module 11 (that is, the under-calibrated block 110 shown in FIG. 1) are positioned right under the light source 210 of the standard illuminate light box 21, such that the optical lens 112 condenses the light at different calibrated color temperatures upon the light sensor 111 to generate different corresponding images. The burning module 12, via the connection port 116 captures the shading images generated when the optical lens 112 condenses the light at each calibrated color temperature upon the light sensor 111, and generates the first adjust parameter set of the compensation parameter set of the NB-cam module 11. After that, the burning module 12 further generates the second adjust parameter set of the compensation parameter set according to the color shift variation of the shading image that is calibrated by using the first adjust parameter set. The calibration unit 121 transmits the compensation parameter set to the compilation unit 122, directly modifies the complied lens-driver firmware, and burns the compiled lens-driver firmware to the memory 113 (in this embodiment the memory unit 113 can be the circuit block of a chip set). In this embodiment, the burning module 12 directly modifies the compiled burning image of the lens-driver firmware according to the compensation parameter set, which saves the time consumption for again compiling the lens-driver firmware after calibrating each NB-cam module in the prior art.

Figure 3:
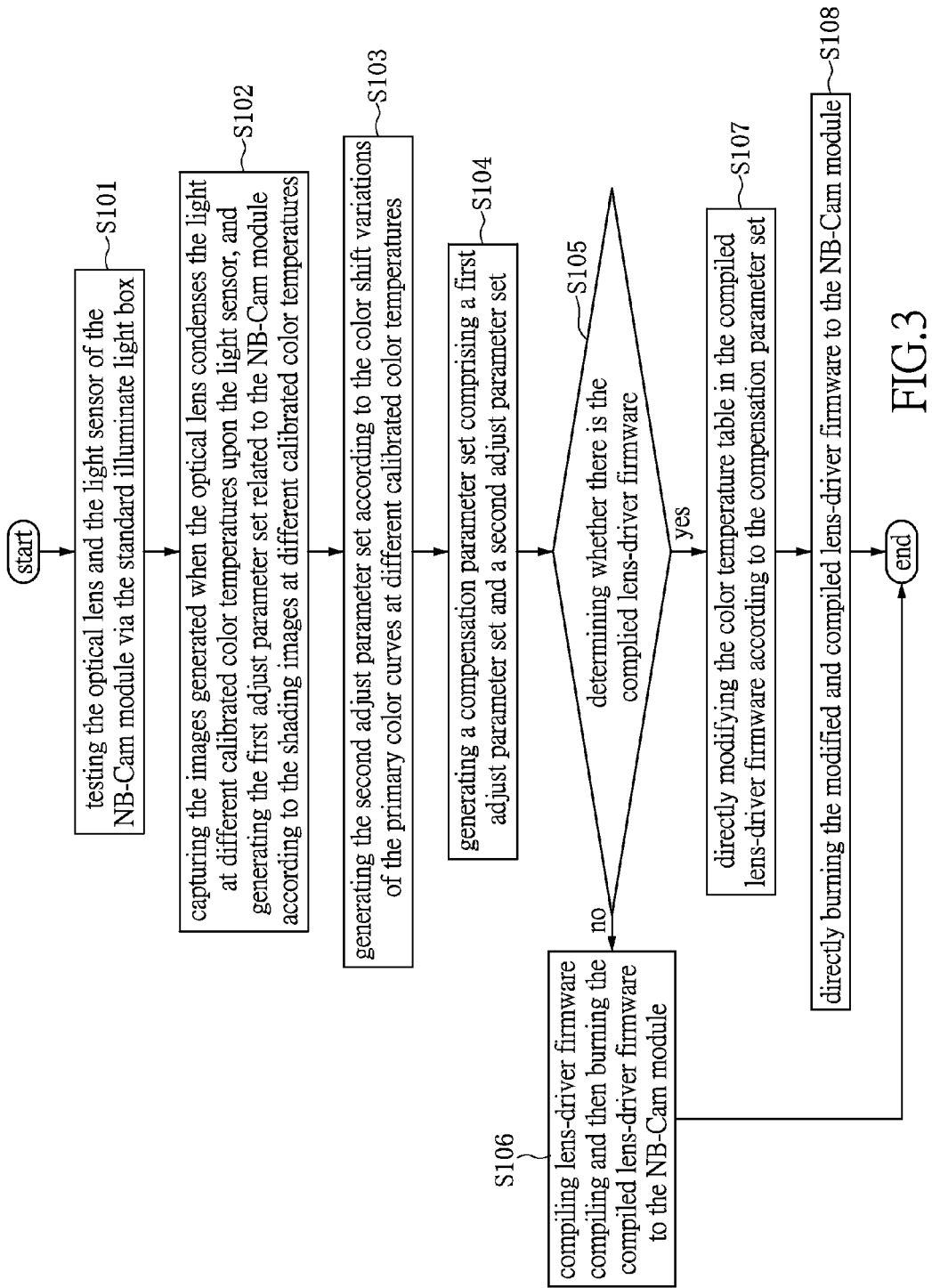
FIG. 3 shows a flow chart of a NB-cam module calibration method of one embodiment of the instant disclosure.

FIG. 3 shows a flow chart of a NB-cam module calibration method of one embodiment of the instant disclosure. The following description is for illustrating the NB-cam module calibration method in the embodiment of the instant disclosure. The NB-cam module calibration method comprises the steps as below. The step S101 is to test the optical lens and the light sensor of the NB-cam module via the standard illuminate light box. The step S102 is to capture the images generated when the optical lens condenses the light at different calibrated color temperatures upon the light sensor, and to generate the first adjust parameter set related to the NB-cam module according to the shading images at different calibrated color temperatures. The step S103 is to generate the second adjust parameter set according to the color shift variations of the primary color curves at different calibrated color temperatures. The step S104 is to generate a compensation parameter set comprising a first adjust parameter set and a second adjust parameter set. The step S105 is to determine whether there is the compiled lens-driver firmware. The step S106 is to compile the lens-driver firmware. The step S107 is to directly modify the color temperature table in the compiled lens-driver firmware according to the compensation parameter set. The step S108 is to directly burn the modified and compiled lens-driver firmware to the NB-cam module.

Figure 4A:
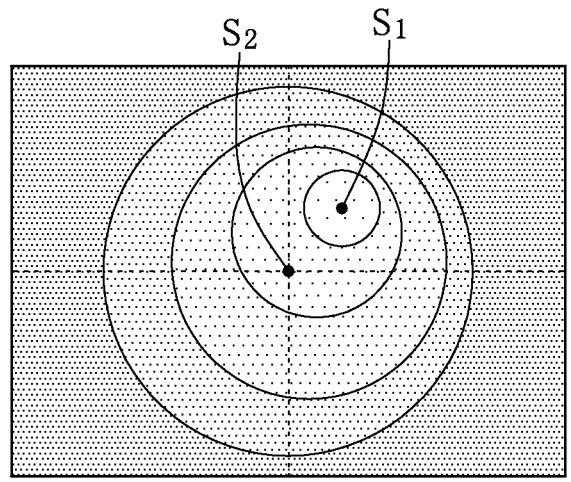
FIG. 4A and FIG. 4B show a schematic drawing of images with the color shift and lens shading generated by a NB-cam module of one embodiment of the instant disclosure.
Figure 4B:
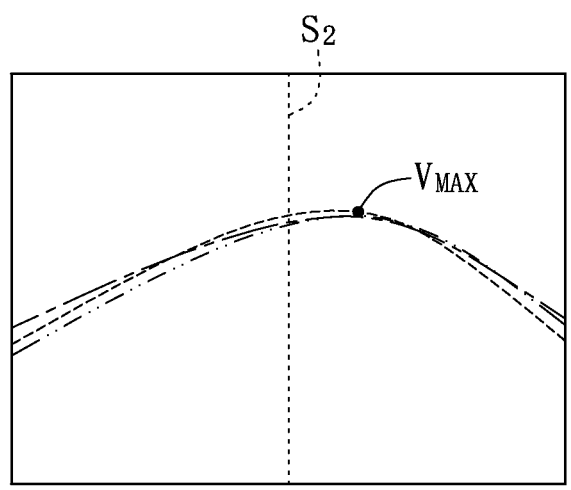

Please refer to FIGS. 1-3. In the step S101, the standard illuminate light box 21 provides an environment of at least one calibrated color temperature, to test each NB-cam module 11 that is to be calibrated. More precisely, in the standard illuminate light box 21, the light of different calibrated color temperatures is generated via the light source 210, such that the light sensor 111 and the optical lens 112 of the NB-cam module 11 test for the images at each calibrated color temperature. In conjunction with FIG. 4A and FIG. 4B, FIG. 4A and FIG. 4B show a schematic drawing of images with the color shift and shadow generated by a NB-cam module of one embodiment of the instant disclosure. For example, FIG. 4A shows the shading image of the NB-cam module 11, which is to be calibrated, at the standard color temperature D65. The production differences of the optical lens 112 make the light condensed not uniform, the optical attenuation and refraction results in the shading image, and the optical axis center Si of the shading image deviates from the image center S2. Specifically speaking, as shown in FIG. 4B, the maximum value VMAX of the primary color curve does not align at the image center S2, which results in the asymmetry of the primary color curve.

Figure 5A:
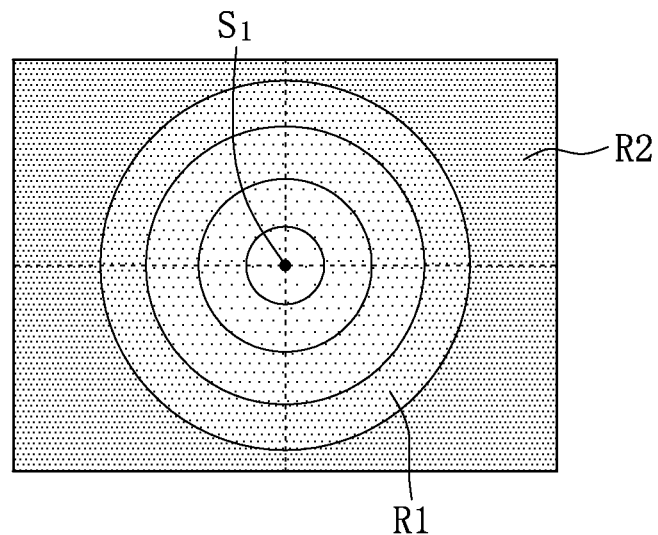
FIG. 5A and FIG. 5B show a schematic drawing of images being calibrated for the color shift of a NB-cam module of one embodiment of the instant disclosure.
Figure 5B:
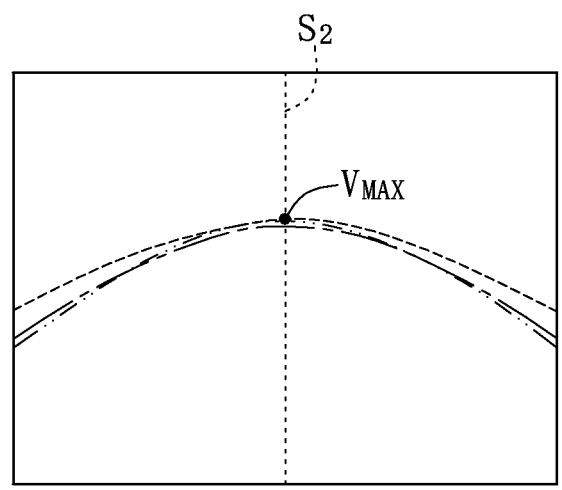

In the step S102, the calibration unit 121 captures the shading image generated when the optical lens 112 of the under-calibrated NB-cam module 11 condenses the light of the light sources 210 at each calibrated color temperature upon the light sensor 111, and generates the first adjust parameter set of the under-calibrated NB-cam module 11, to calibrate and make the maximum value of the primary color curve of the light of the NB-cam module 11 at each calibrated color temperature align at the optical axis center. In conjunction with FIG. 5A and FIG. 5B, FIG. 5A and FIG. 5B show a schematic drawing of images being calibrated for the color shift of a NB-cam module of one embodiment of the instant disclosure. FIG. 5A shows that the under-calibrated NB-cam module 11 is calibrated only via the first adjust parameter set, wherein the optical axis center S1 of the shading image at the standard color temperature D65 is calibrated to be aligned at the center S2 of the image. On the other hand, as shown in FIG. 5B, the maximum value VMAX of the primary color curve of the shading image aligns at the image center S2.

Figure 6A:
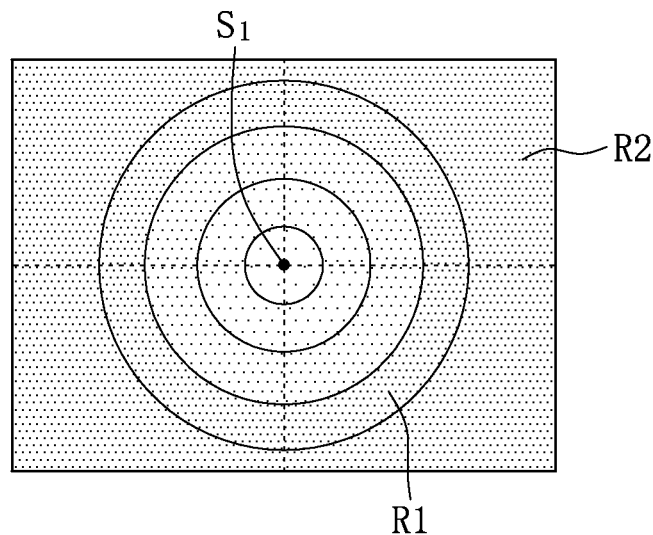
FIG. 6A and FIG. 6B show a schematic drawing of images being calibrated for the color shift and lens shading of a NB-cam module of one embodiment of the instant disclosure.
Figure 6B:
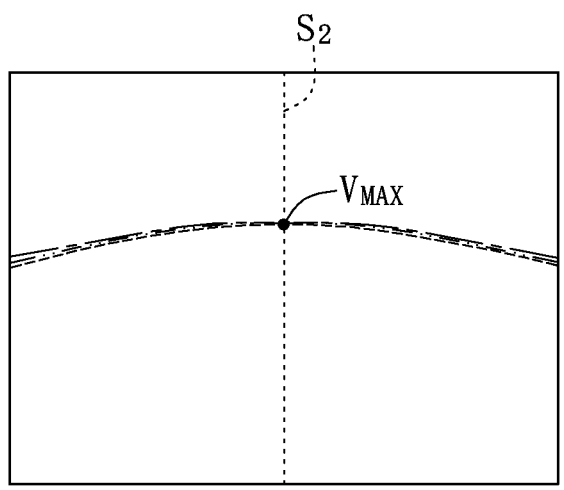

In the step S103, after the calibration unit 121 calibrates the primary color curves at each calibrated color temperature to align at the optical axis center, the calibration unit 121 further generates the second adjust parameter set according to the color shift variation generated when the calibration unit 121 calibrates the primary color curves at each calibrated color temperature to align at the optical axis center, to compensate the variation of the primary color curve of the image generated by the NB-cam module 11. Please refer to both of FIG. 6A and FIG. 6B. FIG. 6A and FIG. 6B show a schematic drawing of images being calibrated for the color shift and lens shading of a NB-cam module of one embodiment of the instant disclosure. The variation of the primary color curve of the shading image at the standard color temperature is adjusted according to the second adjust parameter set (that is, the white balance), and thus, comparing with the shading areas R1 and R2 shown in FIG. 5A, the colors of the areas R1 and R2 in FIG. 6A look closer. On the other hand, comparing with FIG. 5B, the off-peak terminals of each primary color curve of the shading images at the standard color temperature D65 are closer, which means the color shift variation of the areas R1 and R2 shown in FIG. 6B are smaller.

In the step S104, the calibration unit 121 transmits the compensation parameter set of the under-calibrated NB-cam module 11, generated via the first adjust parameter set and the second adjust parameter set, to the compilation unit 122. In other words, this compensation parameter set provides the parameters to implement the calibrating compensation process for the under-calibrated NB-cam module 11.

In the step S105, the compilation unit 122 makes a determination for the under-calibrated NB-cam module 11. Specifically speaking, the compilation unit 122 determines whether there is the complied lens-driver firmware. If the compilation unit 122 determines there is the compiled lens-driver firmware, it goes to the step S107; if the compilation unit 122 determines there is no complied lens-driver firmware, it goes to the step S106. In the step S106, for example, when the first under-calibrated NB-cam module 11 is calibrated and the burning module 12 has not yet compiled any lens-driver firmware, the burning module 12 would implement compiling the first-time lens-driver firmware, and then burn the compiled lens-driver firmware to the NB-cam module 11. Thus, when the second under-calibrated NB-cam module 11 is calibrated, the burning module 12 has already obtained the compiled lens-driver firmware, which would be determined as "there is the compiled lens-driver firmware" in the step S105 and then it goes to the step S107.

In the step S107, the compilation unit 122 can directly modify the compiled lens-driver firmware. More precisely, the compilation unit 122 can directly modify the coding segments related to the color temperature table in the coding of the lens-driver firmware.

In the step S108, the compilation unit 122 has already learned that the code of the color temperature table is at the fixed coded address among the codes of the lens-driver firmware, so after the compilation unit 122 correspondingly modifies the codes of the color temperature table in the lens-driver firmware, the modified lens-driver firmware can be directly provided to the burning module 12 for having a burning process.

To sum up, the NB-cam module calibration method and the system using the same can provide different NB-cam modules to quickly implement the calibration and burning process. Specifically speaking, the instant disclosure generates different compensation parameter sets according to different NB-cam modules, and directly modifies the burning image of the compiled lens-driver firmware by using the compensation parameter set, which saves the time consumption for again compiling after each NB-cam module has been calibrated in the prior art, and also makes each NB-cam module catch the same picture in the same environment and obtain the same image output.

On the other hand, the instant disclosure further generates another set of adjustment parameters via the standard illuminate light box for compensating the color shift variation under each calibrated color temperature, so as to obtain the best calibration result for the NB-cam module under different calibrated color temperatures. More precisely, the operation scale of the NB-cam module used in the notebook products would not be comparable to the operation scale of the image processing chips used in NB-cam modules of other digital cameras, single lens cameras or smart phones, and thus the instant disclosure uses two different compensation parameters to form the color temperature table that helps the NB-cam module used in the notebook products to have a good calibration result even though the operation capability of the present NB-cam module is not as excellent as the image processing chips used in NB-cam modules of other digital cameras, single lens cameras or smart phones.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A NB-cam module calibration method, comprising:
   calibrating an image, wherein the image is generated when an optical lens of each NB-cam module condenses a light upon a light sensor of each NB-cam module, to generate a compensation parameter set corresponding to each NB-cam module;
   directly modifying a color temperature table in a compiled lens-driver firmware according to the compensation parameter set; and
   directly burning each modified and compiled lens-driver firmware to each NB-cam module.

2. The NB-cam module calibration method according to claim 1, wherein within the step of directly modifying a color temperature table in a compiled lens-driver firmware according to the compensation parameter set, the code of the color temperature table is a fixed coded address among the codes of the lens-driver firmware.

3. The NB-cam module calibration method according to claim 1, wherein within the step of calibrating an image, wherein the image is generated when an optical lens of each NB-cam module condenses a light upon a light sensor of each NB-cam module, to generate a compensation parameter set corresponding to each NB-cam module, generating the light at a calibrated color temperature via a standard illuminate light box.

4. The NB-cam module calibration method according to claim 3, wherein the step of calibrating an image, wherein the image is generated when an optical lens of each NB-cam module condenses a light upon a light sensor of each NB-cam module, to generate a compensation parameter set corresponding to each NB-cam module, further comprises:
   capturing a shading image of the image, wherein the image is generated when the optical lens condenses at least the light at the calibrated color temperature upon the light sensor;
   generating a first adjust parameter set of the compensation parameter set according to the shading image generated via the light at the calibrated color temperature, to calibrate a maximum value of a primary color curve of the light at the calibrated color temperature for the NB-cam module and make the maximum value align at an optical axis center.

5. The NB-cam module calibration method according to claim 4, wherein after the step of generating a first adjust parameter set of the compensation parameter set according to the shading image generated via the light at the calibrated color temperature, the method further comprises:
   generating a second adjust parameter set according to a color shift variation generated after calibrating and making the maximum value align at the optical axis center, to compensate the variation of the primary color curve of the image.

6. The NB-cam module calibration method according to claim 4, wherein within the step of capturing a shading image of the image, further capturing the shading images at least three calibrated color temperatures, wherein the three calibrated color temperatures are respectively 2800K(A-light), 4150K(CWF) and 6500K(D65).

7. The NB-cam module calibration method according to claim 1, wherein after the step of calibrating an image, wherein the image is generated when an optical lens of each NB-cam module condenses a light upon a light sensor of each NB-cam module, to generate a compensation parameter set corresponding to each NB-cam module, the method further comprises:
 determining whether there is the compiled lens-driver firmware; and
 if not, compiling the lens-driver firmware and burning the compiled lens-driver firmware to the NB-cam module.

8. The NB-cam module calibration method according to claim 1, wherein the NB-cam module is a notebook NB-cam module.

9. A NB-cam module calibration system, comprising:
 a plurality of NB-cam modules, each NB-cam module condensing the light via an optical lens upon a light sensor of each NB-cam module to generate an image; and
 a burning module, comprising:
  a calibration unit, calibrating the image generated when the optical lens of each NB-cam module condenses the light upon the light sensor of the NB-cam module, to generate a compensation parameter set corresponding to the NB-cam module; and
  a compilation unit, connected to the calibration unit, compiling a lens-driver firmware and directly modifying a color temperature table in the complied lens-driver firmware according to each compensation parameter set;
 wherein the burning module directly burns each modified and complied lens-driver firmware to each NB-cam module.

10. The NB-cam module calibration system according to claim 9, wherein the NB-cam module further comprises:
 a memory unit, storing the lens-driver firmware;
 wherein the code of the color temperature table is a fixed coded address among the codes of the lens-driver firmware.

11. The NB-cam module calibration system according to claim 9, further comprising:
 a standard illuminate light box, providing the light having at least one calibrated color temperature;
 wherein the optical lens condenses the light having at least one calibrated color temperature upon the light sensor to generate the image, to make the calibration unit generate the compensation parameter set.

12. The NB-cam module calibration system according to claim 11, wherein
 when the NB-cam module is set in the standard illuminate light box, the calibration unit captures a shading image of the image, wherein the image is generated when the optical lens condenses at least the light at the calibrated color temperature upon the light sensor, so that the calibration unit generates a first adjust parameter set of the compensation parameter set according to the shading image generated via the light at the calibrated color temperature, to calibrate a maximum value of a primary color curve of the light at the calibrated color temperature for the NB-cam module and make the maximum value align at an optical axis center.

13. The NB-cam module calibration system according to claim 12, wherein the calibration unit further generates a second adjust parameter set according to a color shift variation generated after calibrating and making the maximum value align at the optical axis center, to compensate the variation of the primary color curve of the image.

14. The NB-cam module calibration system according to claim 11, wherein the at least three calibrated color temperatures of the captured shading images are respectively 2800K (A-light), 4150K(CWF) and 6500K(D65).

* * * * *